US012069396B2

(12) United States Patent
Tangeland et al.

(10) Patent No.: US 12,069,396 B2
(45) Date of Patent: Aug. 20, 2024

(54) DYNAMIC VIDEO LAYOUT DESIGN DURING ONLINE MEETINGS

(71) Applicant: Cisco Technology, Inc., San Jose, CA (US)

(72) Inventors: Kristian Tangeland, Oslo (NO); Rune Øistein Aas, Lysaker (NO); Benoit Rouger, Espoo (FI)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/682,382

(22) Filed: Feb. 28, 2022

(65) Prior Publication Data

US 2023/0121654 A1  Apr. 20, 2023

Related U.S. Application Data

(60) Provisional application No. 63/262,583, filed on Oct. 15, 2021.

(51) Int. Cl.
*H04N 5/262* (2006.01)
*G06V 40/16* (2022.01)
(Continued)

(52) U.S. Cl.
CPC .......... *H04N 5/2628* (2013.01); *G06V 40/16* (2022.01); *H04L 65/403* (2013.01); *H04L 65/764* (2022.05); *H04N 5/2624* (2013.01)

(58) Field of Classification Search
CPC ..... G06V 40/16; H04L 65/764; H04L 65/403; H04N 5/2624; H04N 5/2628
(Continued)

(56) References Cited

U.S. PATENT DOCUMENTS 9,269,323 B2 * 2/2016 Edmiston .................. G06F 3/14
2006/0072811 A1    4/2006 Porter et al.
(Continued)

FOREIGN PATENT DOCUMENTS

AU    2008264173 A1    7/2008
AU    2008264173    *   7/2010    ............... H04N 7/58
(Continued)

OTHER PUBLICATIONS

"Conference layouts and speaker names," Pexip Infinity Docs, v27.2, https://docs.pexip.com/admin/changing_layout.htm, retrieved Feb. 28, 2022, 19 pages.
(Continued)

*Primary Examiner* — Maria El-Zoobi
(74) *Attorney, Agent, or Firm* — Edell, Shapiro & Finnan, LLC

(57) ABSTRACT

Presented herein are techniques for cropping video streams to create an optimized layout in which participants of a meeting are a similar size. A user device receives a plurality of video streams, each video stream including at least one face of a participant participating in a video communication session. Faces in one or more of the plurality of video streams are cropped so that faces in the plurality of video streams are approximately equal in size, to produce a plurality of processed video streams. The plurality of processed video streams are sorted according to video stream widths to produce sorted video streams and the plurality of sorted video streams are distributed for display across a smallest number of rows possible on a display of the user device.

20 Claims, 14 Drawing Sheets

(51) Int. Cl.
*H04L 65/403* (2022.01)
*H04L 65/75* (2022.01)

(58) Field of Classification Search
USPC .............................................. 348/14.02–14.9
See application file for complete search history.

(56) References Cited

U.S. PATENT DOCUMENTS

| | | | |
|---|---|---|---|
| 2010/0103245 | A1 | 4/2010 | Decker et al. |
| 2012/0026277 | A1 | 2/2012 | Malzbender et al. |
| 2013/0021494 | A1* | 1/2013 | Kawai ................ H04N 1/00188 348/222.1 |
| 2015/0097915 | A1 | 4/2015 | Navon et al. |
| 2017/0249719 | A1 | 8/2017 | Kansara |
| 2019/0215464 | A1* | 7/2019 | Kumar .................... H04N 7/08 |

FOREIGN PATENT DOCUMENTS

| | | | |
|---|---|---|---|
| JP | 2008264173 | A * | 11/2008 |
| WO | 2010059481 | A1 | 5/2010 |
| WO | 2010141023 | A1 | 12/2010 |
| WO | 2013062509 | A1 | 5/2013 |

OTHER PUBLICATIONS

"Neat Symmetry: Individual Auto Framing," Neat, Neat Support, https://support.neat.no/article/neat-symmetry-individual-auto-framing/, retrieved Feb. 28, 2022, 3 pages.
Microsoft 365, "Microsoft Teams innovations designed for hybrid work," Youtube, https://www.youtube.com/watch?v=UK67Fg6_Sgc&t=41s, Sep. 9, 2021, 1 page.
Pexip, "Introducing Adaptive Composition from Pexip," Youtube, https://youtu.be/peY-Ce6vFhs, Jan. 16, 2020, 2 pages.
"Adaptive Composition," Pexip, AI Video Conferencing Technology, https://www.pexip.com/features/adaptive-composition, retrieved Feb. 28, 2022, 15 pages.
International Search Report and Written Opinion in counterpart International Application No. PCT/US2022/045966, mailed Feb. 3, 2023, 15 pages.

* cited by examiner

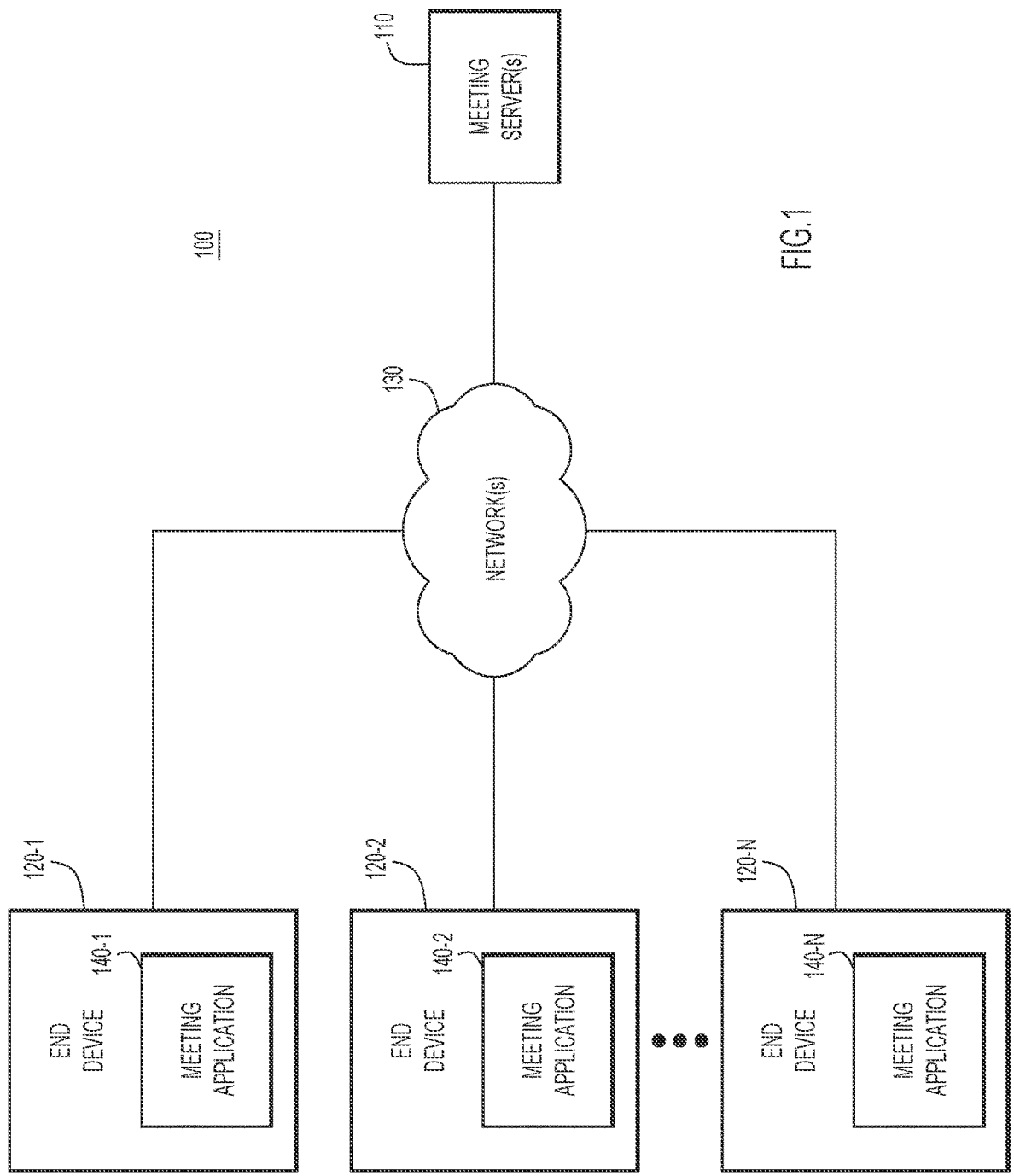

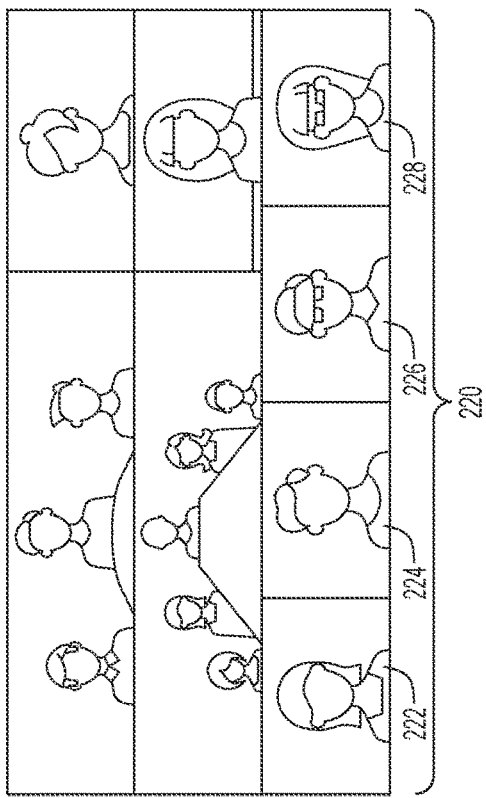
FIG.2A
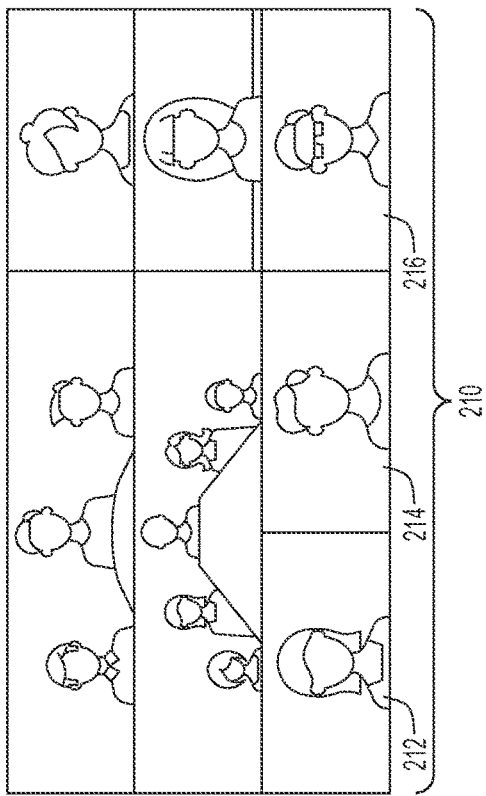
FIG.2B
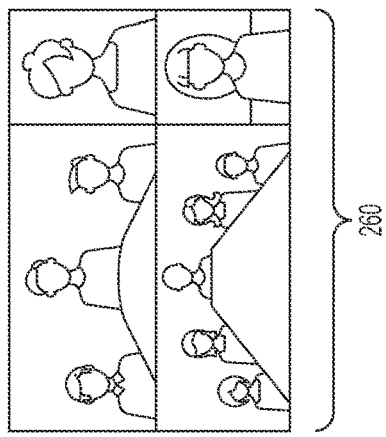
FIG.2C
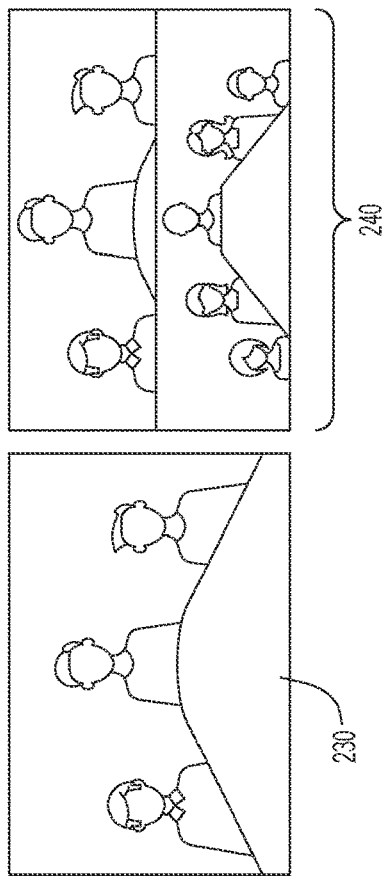
FIG.2D
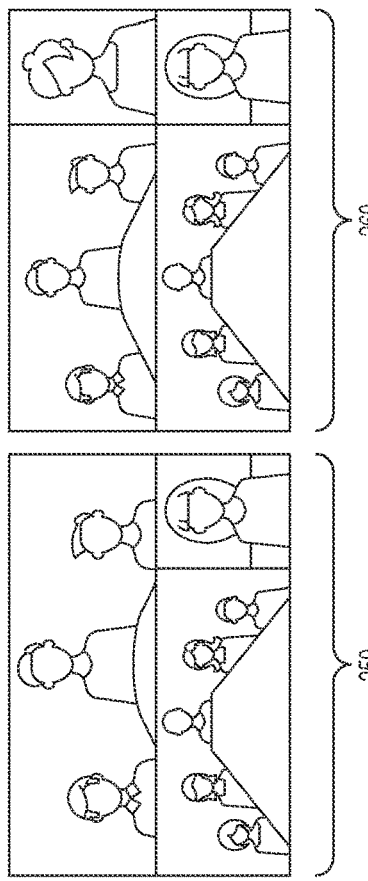
FIG.2E
FIG.2F

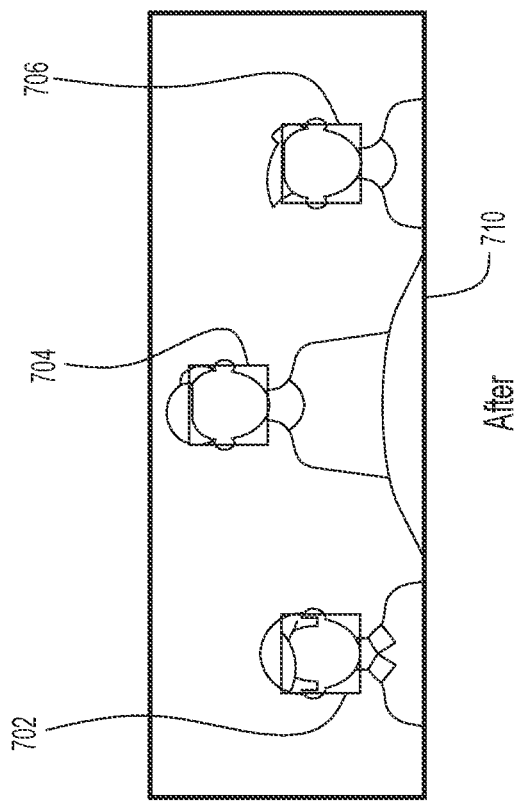
FIG.7B After
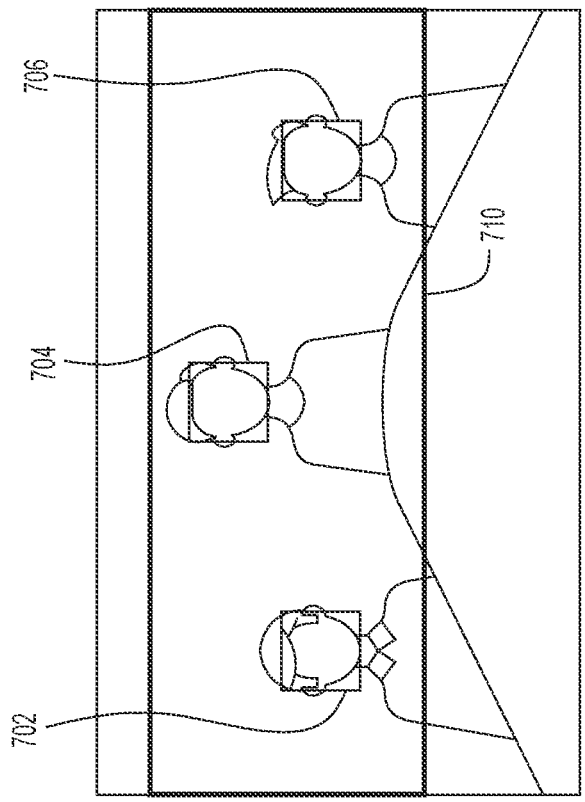
FIG.7A Before

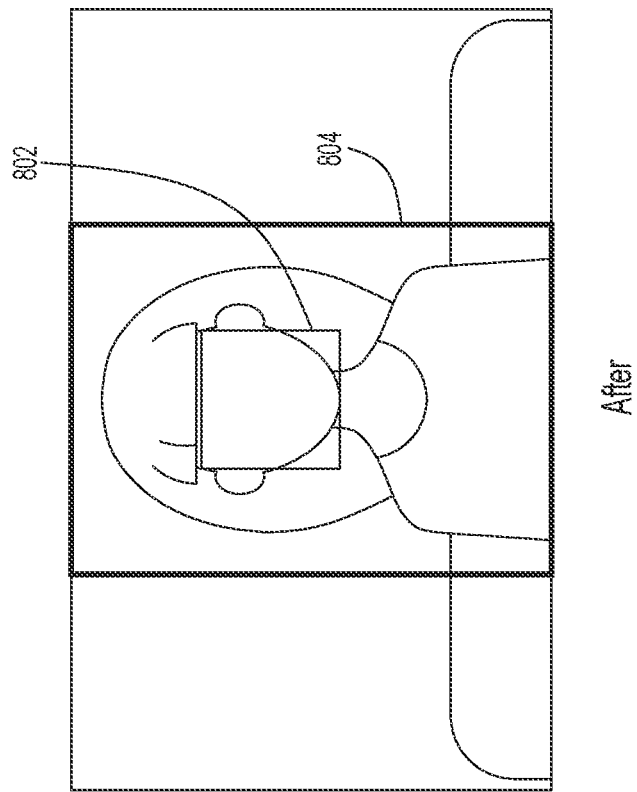
FIG. 8B After
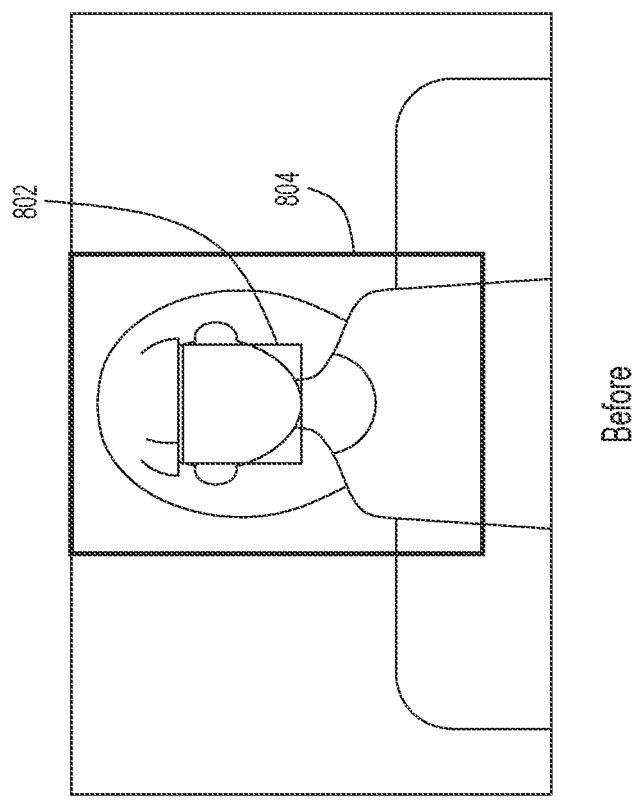
FIG. 8A Before

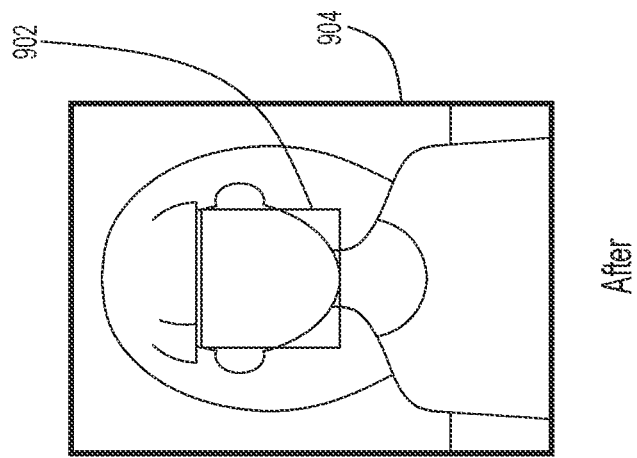
FIG. 9B After
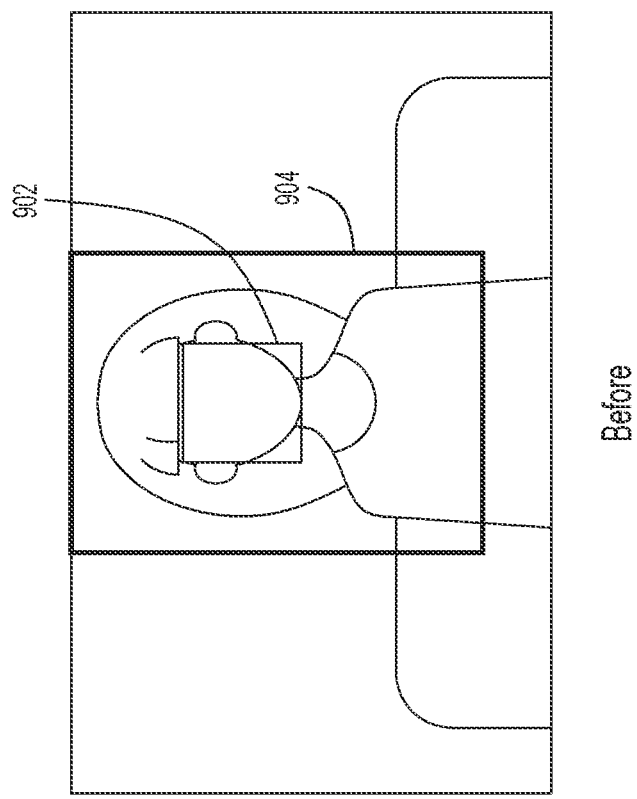
FIG. 9A Before

DYNAMIC VIDEO LAYOUT DESIGN DURING ONLINE MEETINGS

CROSS REFERENCE TO RELATED APPLICATION

This application claims priority to U.S. Provisional Application No. 63/262,583, filed Oct. 15, 2021, the entirety of which is incorporated herein by reference.

TECHNICAL FIELD

The present disclosure relates to online video meetings/conferences.

BACKGROUND

There are many different types of video layouts that may be used in online video conferences, such as voice-switched layout (with or without thumbnail strip), gallery view, voice switched grid, etc. Each layout type has its advantages, but in existing layout types, the size of participants in the online video conference may differ. No layout type adjusts the cropping of video streams so that the size of participants in the online video conference is relatively equal across video streams.

BRIEF DESCRIPTION OF THE DRAWINGS

FIG. 1 is a block diagram of an online video conference/meeting system configured to support dynamic cropping of video streams during meetings, according to an example embodiment.

FIGS. 2A-2F show various ways to optimize screen layout by cropping to maintain relative equal sizes of participants in an online meeting while maximizing screen space, according to an example embodiment.

FIGS. 7A and 7B illustrate cropping a group video stream, according to an example embodiment.

FIGS. 8A and 8B illustrate cropping a video stream to increase a size of a face in the video stream, according to an example embodiment.

FIGS. 9A and 9B illustrate cropping a video stream while maintaining a size of a face in the video stream, according to an example embodiment.

DESCRIPTION OF EXAMPLE EMBODIMENTS

Overview

Figure 3:
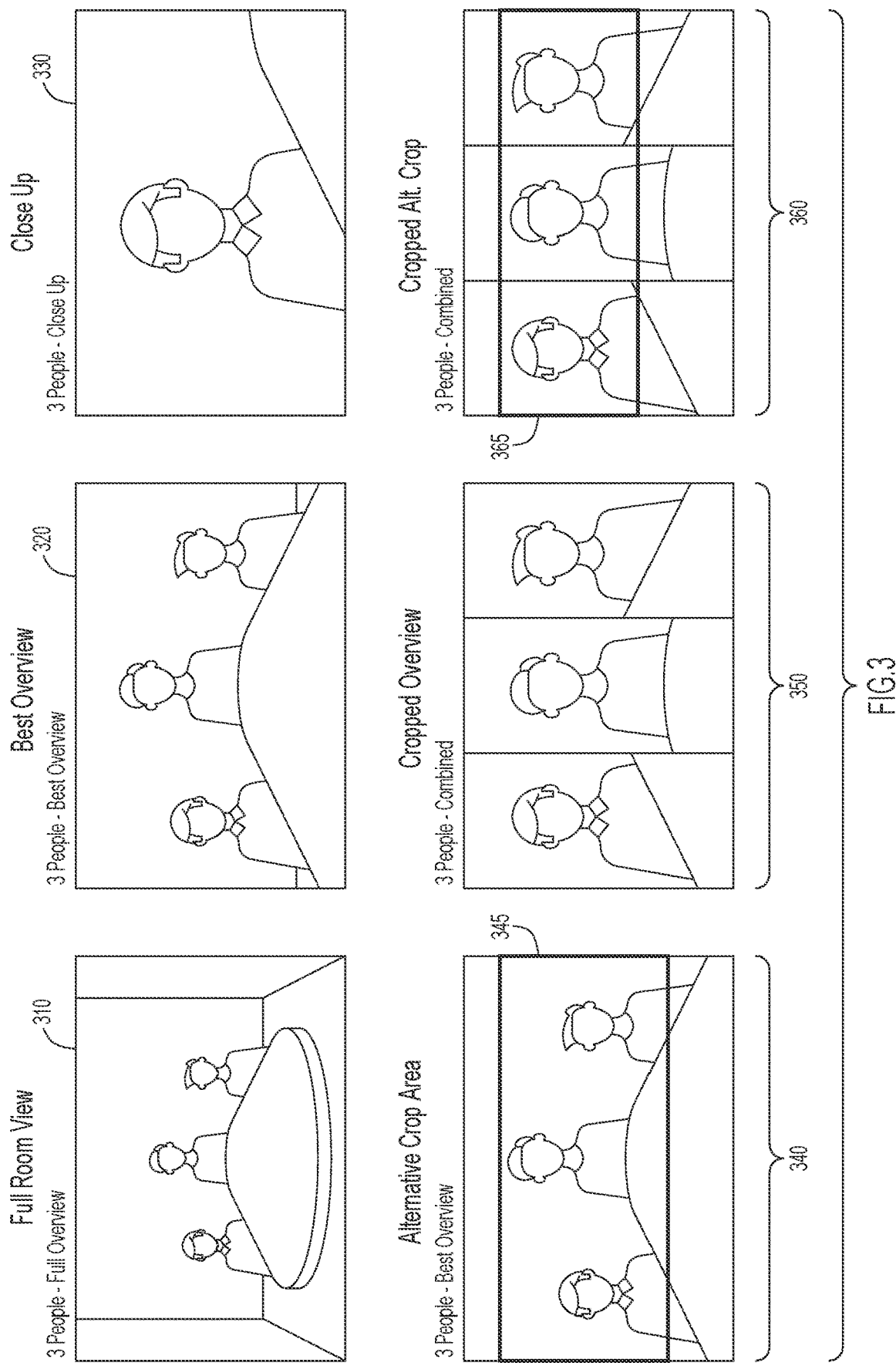
FIG. 3 shows various ways to crop a group video stream according to an example embodiment.

In one embodiment, a method is provided for controlling handling of video streams in a video communication sessions, such as a video conference. The method includes receiving, at a user device, a plurality of video streams, each video stream including at least one face of a participant participating in a video communication session. One or more of the plurality of video streams are cropped so that faces in the plurality of video streams are approximately equal in size, to produce a plurality of processed video streams. The plurality of processed video streams are sorted according to video stream widths to produce sorted video streams, and the plurality of sorted video streams are distributed, for display, across a smallest number of rows possible on a display of the user device.

Example Embodiments

Traditionally, video layouts in video conference/online meetings have displayed an entire video stream received in its original aspect ratio. This has several unwanted effects, such as creating unused screen estate (black areas) and unequal sizes of participants in an online meeting. In other words, in traditional layouts, some participants may take up most of the screen and/or participants appearing together in a room in a single video stream may appear smaller than a single participant alone in a room (e.g., participants using a personal endpoint).

By cropping groups of participants to a wider crop and giving groups more real estate in a layout while additionally cropping individual participants to portrait size, the size of participants in a meeting becomes more equal. Additionally, by dynamically adjusting the amount of crop for each video stream, the unused screen space may be reduced significantly.

Reference is first made to FIG. 1. FIG. 1 shows a block diagram of a system 100 that is configured to provide online meeting services that include services for dynamically adjusting the cropping of video streams so participants in an online meeting appear approximately equal in size and unused screen space is minimized. The system 100 includes one or more meeting server(s) 110 and a plurality of end devices 120-1, 120-2 to 120-N that communicate with meeting server(s) 110 via one or more networks 130. The meeting server(s) 110 are configured to provide an online meeting service for hosting a communication session among end devices 120-1 to 120-N.

The end devices 120-1 to 120-N may be tablets, laptop computers, desktop computers, Smartphones, virtual desktop clients, videoconference endpoints, or any user device now known or hereinafter developed that can run a meeting client, such as meeting applications 140-1, 140-2, to 140-N, or similar communication functionality. The end devices 120-1 to 120-N may have a dedicated physical keyboard or touch-screen capabilities to provide a virtual on-screen keyboard to enter text. The network(s) 130 may include wired local and wide-area networks as well as wireless local and wide-area networks. The devices 120-1 to 120-N may also have short-range wireless system connectivity (such as Bluetooth™ wireless system capability, ultrasound communication capability, etc.) to enable local wireless connectivity with a videoconference endpoint in a meeting room or with other user devices in the same meeting room.

Meeting applications 140-1 to 140-N may be executed by end devices 120-1 to 120-N to provide communication to the meeting server 110 and control user participation in an online meeting that is supported by the meeting server 110. The meeting server 110 and the meeting applications 140-1-140-N are configured to support dynamic video layout design techniques during online meetings. For example, meeting applications 140-1 to 140-N may receive video streams from end devices (e.g., end devices 120-1 to 120-N) and crop the video streams so that faces of participants in the video streams are approximately the same size. In some embodiments, meeting applications 140-1 to 140-N may additionally distribute the video streams across a fewest number of rows possible on a display of an end device (e.g., one of end devices 120-1 to 120-N) to minimize unused pixels on the display of the end device. In some embodiments, when a group of participants are participating in an online meeting in a single video stream, a sender meeting application 140-1 to 140-N may crop the video stream prior to transmitting the video stream to meeting server 110 to reduce empty space around the participants in the video stream.

Reference is now made to FIGS. 2A-2F, with continued reference to FIG. 1. FIGS. 2A-2F show examples of video layouts in which an amount of crop of video streams may be dynamically adjusted so that sizes of participants in the video streams remain consistent compared to other participants and so that an amount of unused screen space is minimized. As illustrated in FIGS. 2A-2F, the aspect ratio and cropping of individual video streams may be adjusted dynamically so that the size of participants in each stream is relatively the same regardless of the number of video streams included in the video layout.

As illustrated in FIG. 2A, video layout 210 includes seven video streams. Although some video streams contain multiple participants and some video streams include single participants, the sizes of the participants remain relatively equal across all video streams. As illustrated in FIG. 2B, when an eighth video stream is added to video layout 220, the cropping of the video streams may be adjusted to make space for the additional video stream while maintaining a consistent size of the participants and minimizing black space around the video streams. For example, video stream 214 in video layout 210 of FIG. 2A is cropped on the left and right sides to produce video stream 224 in video layout 220 of FIG. 2B while maintaining a consistent size of the participant in the video streams. Similarly, video streams 212 and 216 in video layout 210 of FIG. 2A are cropped to produce video streams 222 and 226 in video layout 220 of FIG. 2B, respectively. In this way, the sizes of video streams 212, 214, and 216 are reduced to create video streams 222, 224, and 226 and make room for new video stream 228 while maintaining the sizes of the participants in the video streams.

As shown in FIGS. 2C-2F, the sizes, aspect ratios, and cropping of video streams in video layouts 230, 240, 250, and 260 may be adjusted so the sizes of the participants across the layout remain consistent regardless of the number of video streams included in the video layout or the number of participants in each individual video stream. For example, video layout 230 of FIG. 2C includes a single video feed with three participants, video layout 240 of FIG. 2D includes two video streams (e.g., two group video streams), video layout 250 of FIG. 2E includes three video streams (e.g., two group video streams and one single video stream), and video layout 260 of FIG. 2F includes four video streams (e.g., two group video streams and two single video streams). As described further below, by adjusting the sizes, aspect ratios, and cropping of the video streams, additional video streams may be added to a layout while maintaining relatively equal sizes of participants in the video streams and reducing unused space on the screen. In some embodiments, when a video stream is added to a video layout that includes multiple group video streams (e.g., video layout 250 of FIG. 2E), a size or aspect ratio of the group video stream with the smallest number of participants may be adjusted to make room for the single video stream. In other embodiments, a size or aspect ratio of the group video stream with a largest average face size may be adjusted to make room for the single video stream.

Reference now is made to FIG. 3. FIG. 3 shows examples of crop areas that may be utilized for a full room group view with multiple participants. The crop areas illustrated in FIG. 3 may be generated by a sender end device 120-1 to 120-N using a sender side algorithm, as discussed below with respect to FIG. 4. For example, a sender end device 120-1 to 120-N may crop a video feed that includes more than one participant to eliminate empty space around the participants prior to sending the video feed to meeting server(s) 110.

In some embodiments, metadata may be determined by a sender end device 120-1 to 120-N that may include information about the scene (e.g., position and size of participants, group crop area, type of current framing, etc.). The metadata may be transmitted with the video stream to meeting server(s) 110 and/or other end devices 120-1 to 120-N in the online meeting.

In the example illustrated in FIG. 3, at 310, a camera may capture a full overview of a conference room with three people. By zooming in on the participants, at 320, a best overview of the three people may be created in which the participants appear larger than in the full room view. The best overview is a camera framing that contains all participants in the room, reducing the empty area around the participants, and is normally in a 16:9 aspect ratio. By zooming in further, as shown at 330, a close up view of a participant may be created in which the participant appears larger than in the best overview.

As further illustrated in FIG. 3, at 340, an alternative or group crop area may be created using the rectangle 345 around the three participants. The alternative/group crop illustrates an area within the best overview that contains the most narrow crop that still includes the participants' heads and upper bodies with a small buffer. For groups of participants in the same video stream (e.g., in the same conference room), the aspect ratio of the group crop area is normally wider than the aspect ratio of the video streams. For a video stream with an aspect ratio of 16:9, the group crop is typically between 16:9 and 32:9.

In addition, at 350, a crop showing a close up of each participant individually may be performed to create a grid view of the three participants. The grid view is similar to a best overview where empty parts of the scene are removed to focus closer on the participants. In addition, empty parts in between participants are removed. Finally, at 360, an alternative crop may be added to the metadata of the grid view framing in order for the receiver to get the option of further cropping the framing, depending on the rest of the received video streams (as shown by the rectangle 365), which results in the participants appearing the largest.

Figure 4:
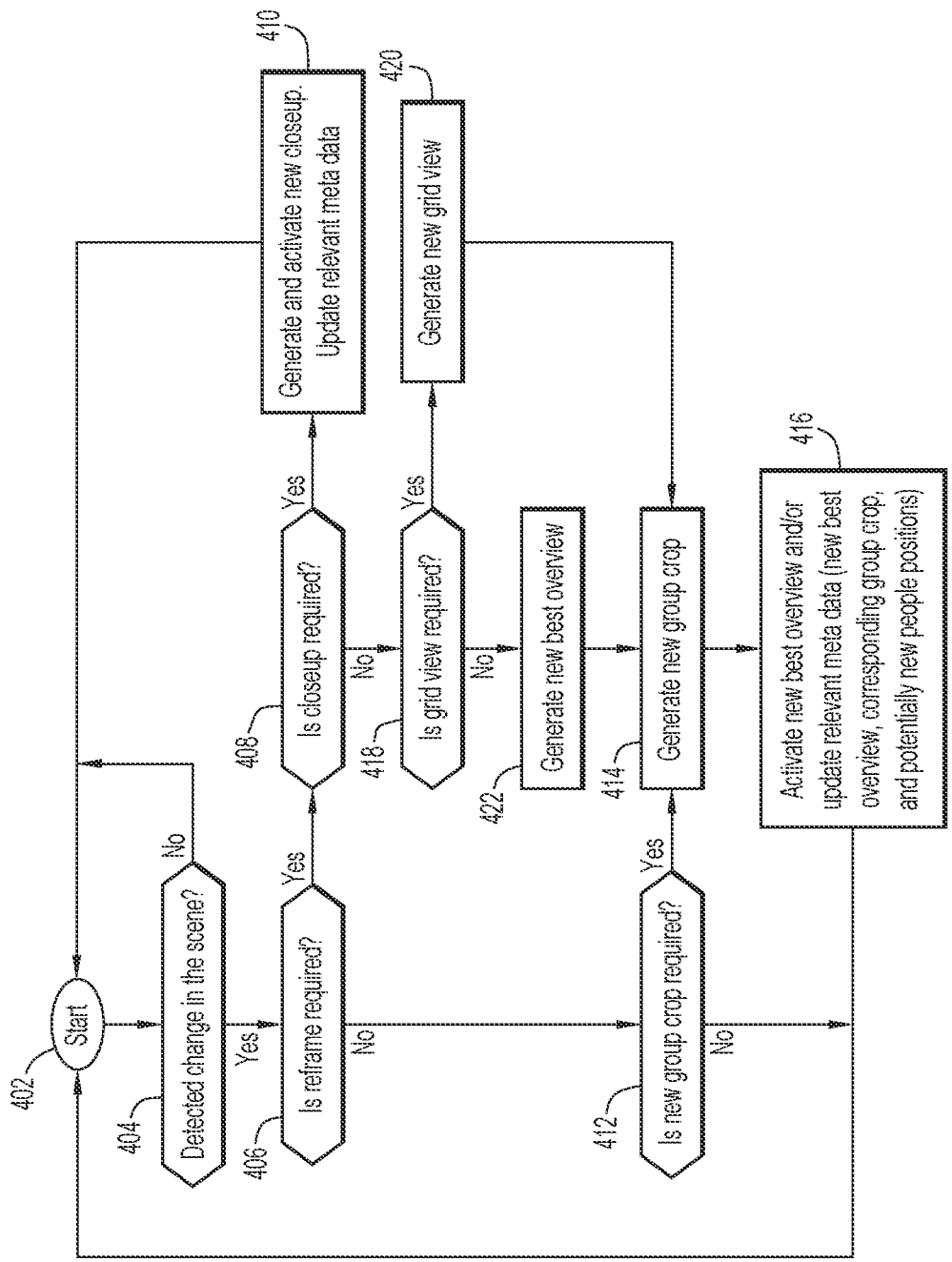
FIG. 4 is a flow diagram illustrating a sender side algorithm to crop video streams, according to an example embodiment.

Reference now is made to FIG. 4, with continued reference to FIGS. 1-3. FIG. 4 is a flow diagram illustrating a sender side algorithm 400 that may be used by a sender end device 120-1 to 120-N to determine a cropping of a video feed containing multiple participants prior to transmitting the video feed to meeting server(s) 110 as well as generating and transmitting metadata, according to an implementation.

At 402, the sender side algorithm 400 starts and, at 404, it is determined whether a change in the scene is detected (e.g., a participant leaves or moves to a new location, a new participant enters the scene, etc.). If no change is detected, the flow returns to the start without any actions being performed. If a change in the scene is detected, at 406, it is determined whether a reframe is required. A reframe is required if the current framing is classified as bad. A framing may be classified as bad if too much of a required area of the video feed is outside the framing or a ratio of field of view (FOV)/ideal FOV is too large (the limit or threshold may be 1.3 for a bad framing, for example). The required area includes a small area around a participant's face that must be included in the framing.

A reframing may additionally be required if the current framing is classified as medium for above a threshold period of time (e.g., 15 seconds). A framing is classified as medium if too much of the medium area is outside the framing or if there is a too large ratio of FOV/ideal FOV (the limit or threshold may be 1.15 for a medium framing). The medium area is an average of the required area and a desired area. The desired area includes a larger area around the participant's face that should be included in the framing. When reframing, the desired area is included in the crop.

If reframing is necessary, at 408 it may be determined whether a close up is required. A close up may be required if there is an active speaker and the current view is bad for the active speaker (e.g., the face of the active speaker is too small in the current view). If the close up is required, at 410, a new close up is generated and activated and relevant metadata is updated.

If reframing is not necessary, at 412 it may be determined whether a new group crop is required. A new group crop may be required if the current group crop is classified as bad. A current group crop may be classified as bad if too much of the required area is outside the crop or the overlap between the current and ideal group crop is less than 75%, for example. If a new group crop is required, at 414 the new group crop is generated and at 416, the relevant metadata is updated (i.e., the new group crop coordinates and potentially new people positions are sent as metadata).

If the close up is not required, at 418 it is determined whether a grid view is required. A grid view is required if there are at least two groups of participants that may be better framed separately, rather than together. If a grid view is required, at 420 the new grid view is generated and the flow continues to 414, where a new group crop is generated, as discussed above. If the grid view is not required, at 422 the new best overview is generated. After the new best overview is generated, flow continues to 414, where the new group crop is generated and, at 416, the new best overview is activated and/or the relevant metadata is updated, as discussed above.

Figure 5:
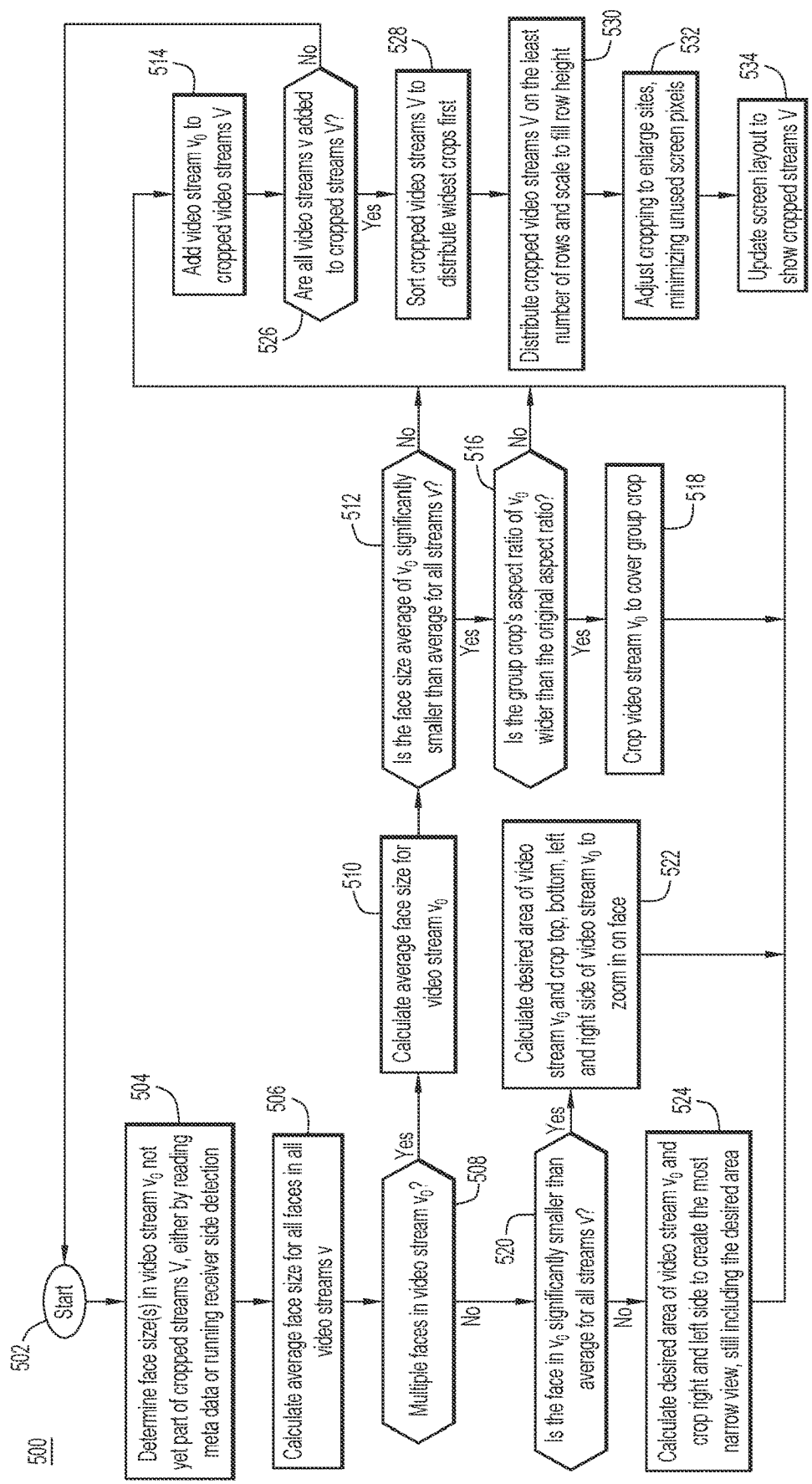
FIG. 5 is a flow diagram illustrating a receiver side algorithm to crop video streams, according to an example embodiment.

Reference now is made to FIG. 5 with continued reference to FIGS. 1-4. FIG. 5 is a flow diagram illustrating a receiver side algorithm 500 that may be used to determine a cropping of participants in an online meeting, according to an implementation. An end device 120-1 to 120-N or a meeting application 140-1 to 140-N may perform the receiver side algorithm after receiving a video stream from meeting server(s) 110 and/or another end device 120-1 to 120-N. For example, an end device 120-1 to 120-N may receive video streams (and, in some embodiments, metadata) from other end devices 120-1 to 120-N and the end device 120-1 to 120-N or a meeting application 140-1 to 140-N at the receiving end device 120-1 to 120-N may execute an algorithm to adjust the sizes, aspect ratios, and/or cropping of video streams to provide an ideal video layout.

At 502, FIG. 5 starts and, at 504, the receiver side algorithm 500 may determine face size(s) in received video streams either by reading metadata received with the video streams or by running a receiver side detection, as described below with respect to FIG. 6.

Figure 6:
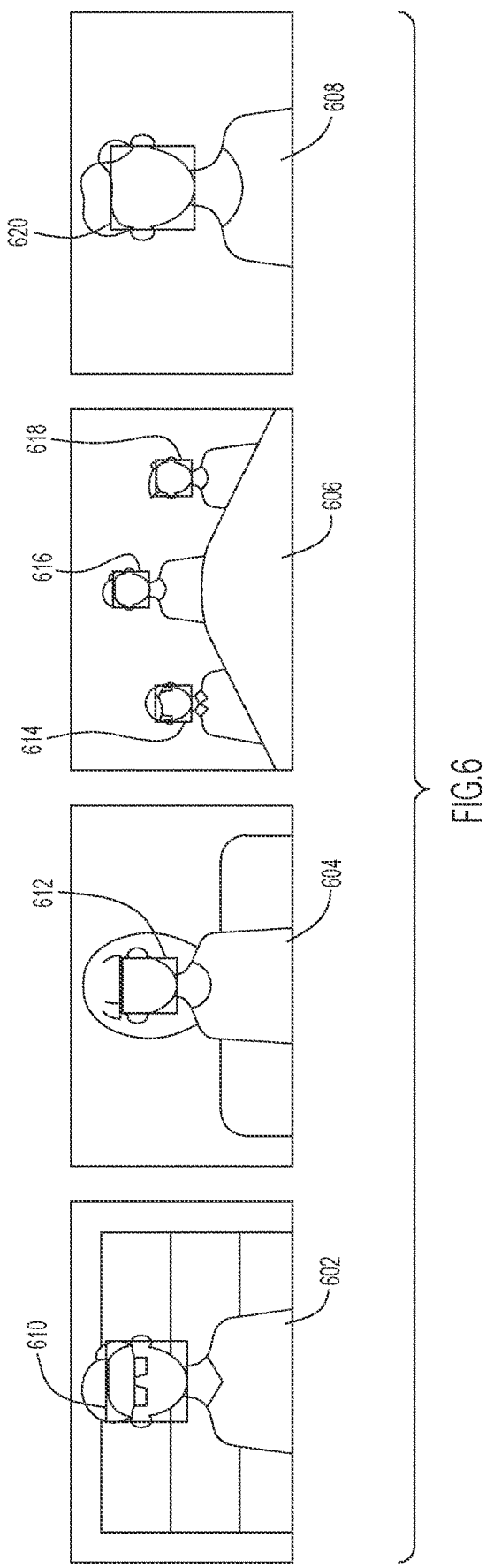
FIG. 6 illustrates identifying faces in video streams, according to an example embodiment.

Reference now is made to FIG. 6. FIG. 6 illustrates video streams in which face sizes are determined either by reading metadata or running receiver side detection. As illustrated in FIG. 6, an end device 120-1 to 120-N may receive video streams 602, 604, 606, and 608 from other end devices 120-1 to 120-N and end device 120-1 to 120-N may determine face sizes of the participants in the video streams 602-608 by reading metadata received with the video streams or by detecting the faces in the video streams. Squares 610, 612, 614, 616, 618, and 620 outline the faces of different participants in the received video streams 602-608. For example, receiver end device 120-1 to 120-N may determine that video streams 602, 604, and 608 each contain a single participant and face sizes of the single participants (which are outlined using squares 610, 612, and 620) may be determined. Receiver end device 120-1 to 120-N may additionally determine that video stream 606 includes three participants and the sizes of the faces of the three participants (which are outlined using squares 614, 616, and 618) may be determined.

Returning to FIG. 5, at 506, an average face size for all faces in the received video streams may be calculated. For example, a receiver end device 120-1 to 120-N may determine face sizes for all of the faces identified in the received video streams and the receiver end device 120-1 to 120-N may calculate an average of the face sizes. At 508, it is determined whether there are multiple faces in a video stream. If there are multiple faces in the video stream, at 510, an average face size may be calculated for the faces in the group video stream. For example, end device 120-1 to 120-N may determine a face size for each face in the group video stream and may calculate an average of the face sizes. At 512, it is determined whether the face size average for the group video stream is significantly smaller than the average face size calculated for all video streams (e.g., the average face size calculated at 506).

If the face size average for the group video stream is not significantly smaller than the average for all of the video streams, at 514, the group video stream may be added to a group of cropped video streams without altering a size or shape of the video stream. If the face size average is significantly smaller than the average for all of the streams, at 516, it may be determined whether an aspect ratio of a group crop of the video stream is wider than the original aspect ratio. For example, end device 120-1 to 120-N may determine a group crop for the video stream and may determine whether an aspect ratio of the cropped video stream using the group crop is wider than an original aspect ratio of the video stream before the video stream was cropped. If the group crop's aspect ratio is not significantly wider than the original aspect ratio, at 514, the video stream may be added to the group of cropped video streams without further changing a size or shape of the video stream. If the group crop's aspect ratio is wider than the original aspect ratio, at 518, the video stream may be cropped to cover the group crop and the cropped video stream may be added to the group of cropped video streams.

Reference is now made to FIGS. 7A and 7B. FIGS. 7A and 7B illustrate an example in which a video stream with multiple faces is cropped. In the "Before" example shown in FIG. 7A, an average face size of the three faces (the face sizes are indicated by squares 702, 704, and 706) is calculated and it is determined that the average face size of the faces in the video stream is significantly smaller than an average for all received video streams. A group crop of the video stream, which is indicated by rectangle 710, is determined and it is further determined that an aspect ratio of the group crop is wider than the original aspect ratio. Since the aspect ratio of the group crop is wider than the original aspect ratio, the video stream is cropped to cover the group crop, as illustrated in the "After" example in FIG. 7B.

Returning to FIG. 5, if there are not multiple faces in the video stream, at 520, it is determined whether the face in the video stream is significantly smaller than an average face size for all streams. If the face size is significantly smaller than the average face size calculated for all received video streams, at 522, a desired area of the video stream is determined and the top, bottom, left side, and right side of the video stream is cropped to zoom in on the face. The desired area may include, for example, the head and upper body of a participant with a buffer around the head and upper body. When the crop is completed, at 514, the cropped video stream is added to the group of cropped video streams.

Reference is now made to FIGS. 8A and 8B. In FIGS. 8A and 8B, an example is illustrated in which a video stream with a single face is cropped. In the "Before" example shown in FIG. 8A, the face size (which is illustrated by square 802) is significantly smaller than an average face size for all received video streams and the desired area (illustrated by rectangle 804) is calculated. As shown in the "After" picture in FIG. 8B, the top, bottom, left side, and right side of the video stream is cropped to zoom in on the face. The face size after the crop is performed (as illustrated in FIG. 8B) is larger than the face size before the video stream is cropped (as illustrated in FIG. 8A).

Returning to FIG. 5, if the face is not significantly smaller than the average face size calculated for all received video streams, at 524, the desired area of the video stream is calculated and the right side and left side of the video stream is cropped to create the most narrow view that includes the desired area. When the crop is completed, at 514, the cropped video stream is added to the cropped video streams.

Reference is now made to FIGS. 9A and 9B. FIGS. 9A and 9B illustrate another example in which a video stream with a single face is cropped. In the "Before" example shown in FIG. 9A, the face size of the participant in the video stream, which is illustrated by square 902, is not significantly smaller than an average face size calculated for all video streams and the desired area (illustrated by rectangle 904) is calculated. In the "After" picture illustrated in FIG. 9B, the right and left sides of the video stream are cropped to create the narrowest view that still includes the desired area. Because the face size is not significantly smaller than the average face size, a crop to zoom in on the face does not need to be performed. By cropping the left and right sides, a more narrow view that includes the desired view of the participant without unnecessary area around the area may be achieved. As illustrated in FIGS. 9A and 9B, the face size after the crop is the same size as the face size before the crop.

Returning to FIG. 5, after the video streams have been added to the group of cropped video stream at 514, at 526, it is determined whether all video streams are added to the cropped streams. If all video streams are not added to the cropped streams, processing returns to the start at 502. When all video streams are added to the cropped streams, at 528, the cropped video streams are sorted to distribute the widest video streams first. When the video streams are sorted, at 530, the cropped video streams are distributed on the least number of rows possible on a display of end device 120-1 to 120-N and scaled to fill the row height. When the cropped videos are distributed, at 532, the crops of the video streams may be adjusted to enlarge video streams and minimize unused screen pixels. At 534, the screen layout on a display of end device 120-1 to 120-N is updated to show the cropped streams.

Reference is now made to FIGS. 10A-10D. FIGS. 10A-10D illustrate adjusting the crop of video streams and updating the screen layout to show the adjusted cropped video screens, as described above in 528-534.

Figure 10A:
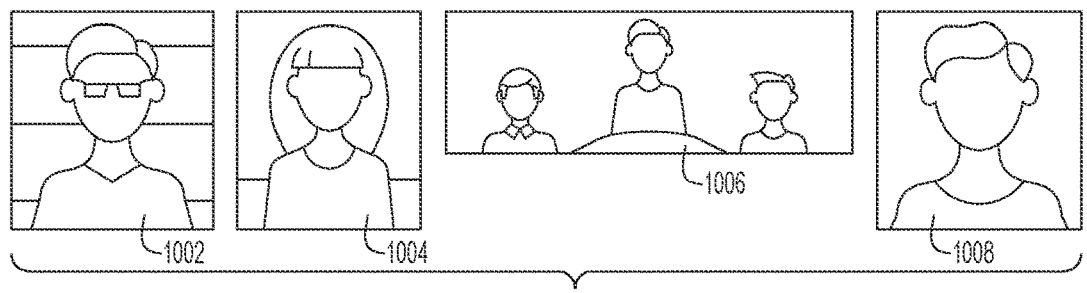
FIGS. 10A-10D illustrate distributing video streams to maximize screen space, according to an example embodiment.
Figure 10B:
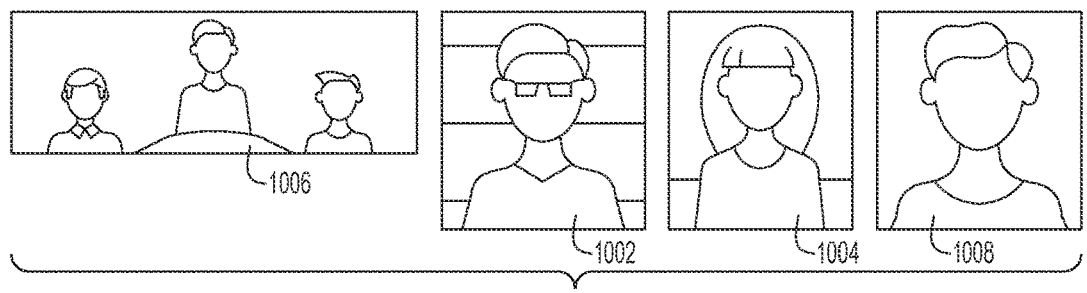

As show in FIG. 10A, video streams 1002, 1004, 1006, and 1008 have been added to the group of cropped video streams (e.g., with or without being cropped). As shown in FIG. 10B, the cropped video streams are sorted based on a width of the cropped videos. For example, the video streams are sorted to distribute the widest video streams first. As shown in FIG. 10B, the group video stream 1006 is the widest crop and, therefore, is sorted to be distributed first.

Figure 10C:
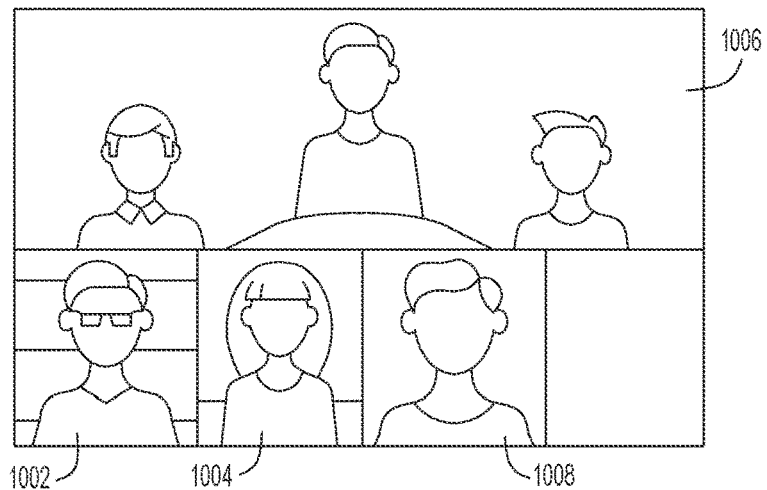

As shown in FIG. 10C, the cropped video streams are distributed on the least number of rows and scaled to fill the row height. In this case, the four cropped video streams are distributed on two rows. The distribution may alter the order of the video streams because, in some cases, altering the order may result in a more efficient use of screen real estate. In some embodiments, a distribution algorithm that determines the distribution of the cropped video streams may attempt to maximize the width of group crops, thus prioritizing using few rows.

Figure 10D:
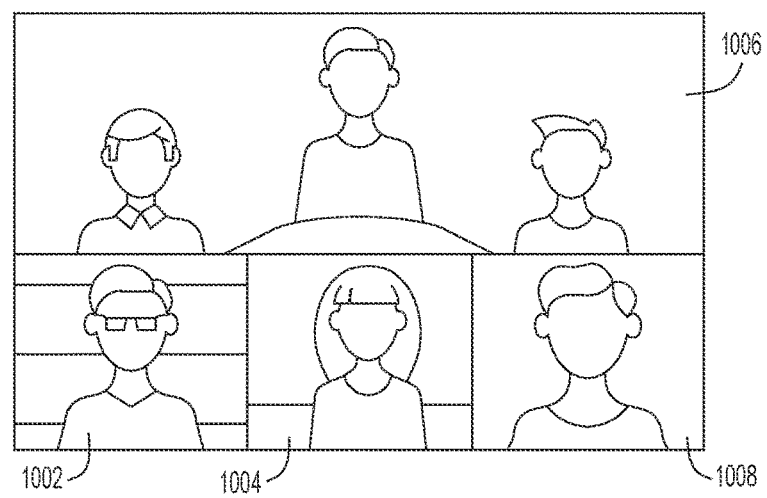

After the cropped video streams are distributed on the smallest number of rows possible, as illustrated in FIG. 10D, the crops of the video streams may be adjusted to enlarge video streams and minimize unused screen pixels. For example, as illustrated in FIG. 10D, the crops of each of video streams 1002, 1004, and 1008 in the bottom row has been adjusted to widen the video streams so that a width of the combination of the video streams on the bottom row is approximately the same size as the width of the video stream on the top row. By enlarging the area around each participant, black space on the screen is minimized, which results in a more efficient use of the screen space. For example, by widening video streams 1002, 1004, and 1008, the black area to the right of video stream 1008 in FIG. 10C has been eliminated, which results in a more efficient use of space and a more visually pleasing layout. After the cropping is adjusted, the layout displayed on the screen is updated.

Figure 11A:
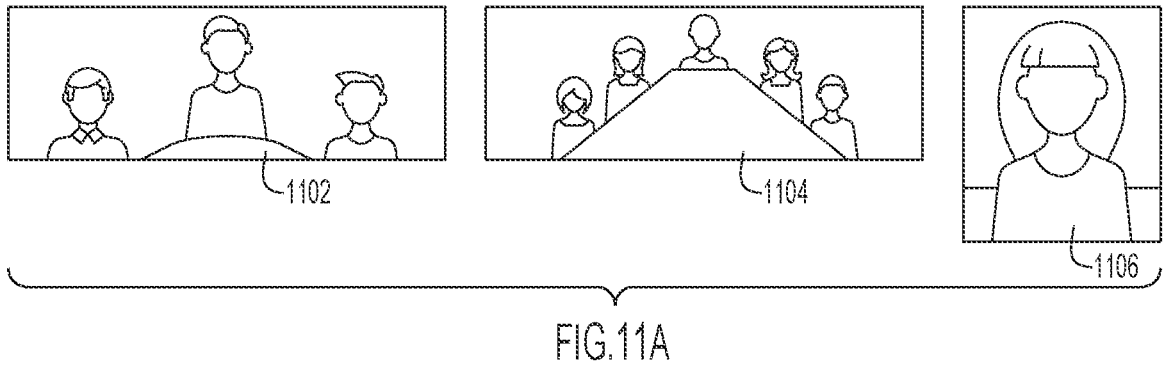
FIGS. 11A and 11B illustrate maximizing screen space by changing an aspect ratio of a video stream, according to an example embodiment.
Figure 11B:
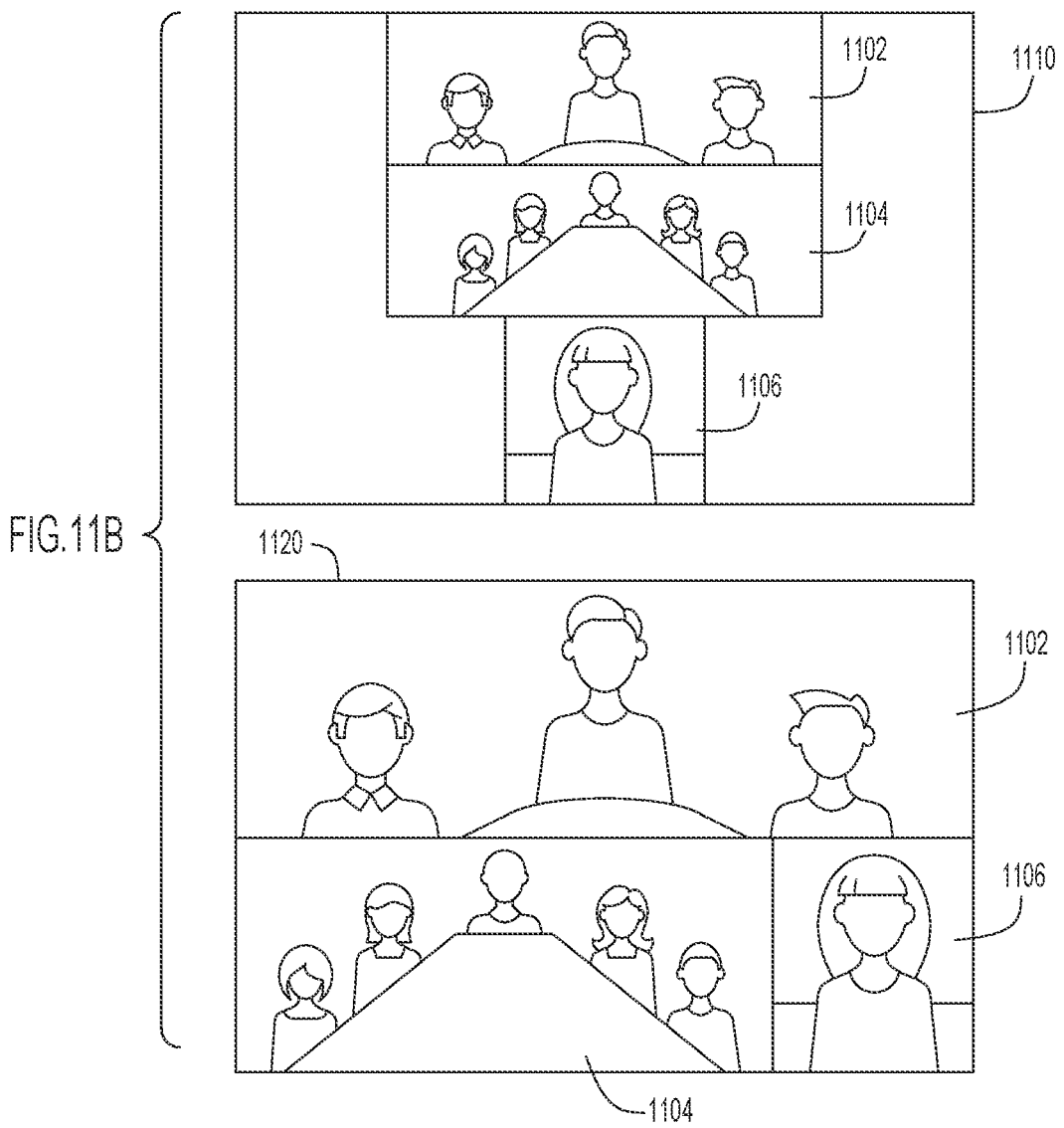

Reference is now made to FIGS. 11A and 11B. Referring now to FIGS. 11A and 11B, an aspect ratio of video streams may be adjusted to optimize screen space/real estate. As illustrated in FIG. 11A, video streams 1102, 1104, and 1106 are added to a group of cropped video streams and sorted based on width. For example, the video streams are sorted to distribute the widest video streams (e.g., video streams 1102 and 1104) first.

FIG. 11B illustrates two examples of ways in which video streams 1102, 1104, and 1106 may be distributed on a screen. In the example shown at 1110, group video streams 1102 and 1104 have been cropped to the aspect ratio of 32:9 from the original 16:9 aspect ratio. With this cropping, the video streams are split into three rows to maintain maximum cropping. However, as illustrated by 1120, by changing the aspect ratio of group video stream 1104 to 24:9 (i.e., reducing the amount of the crop at the top and the bottom of the video stream), all three video streams may be placed across two rows. In some embodiments, when a video stream is added to a video layout that includes multiple group video streams, the aspect ratios of the group video streams may be adjusted based on a number of participants in the group streams or based on average face sizes of the participants in the group video streams. Since the overall sizes of the faces are larger when reducing an amount of the crop, reducing the amount of the crop may be beneficial. Flexible cropping of video streams allows the sizes of faces to be optimized while also optimizing the screen real estate and reducing black space on a display.

Figure 12:
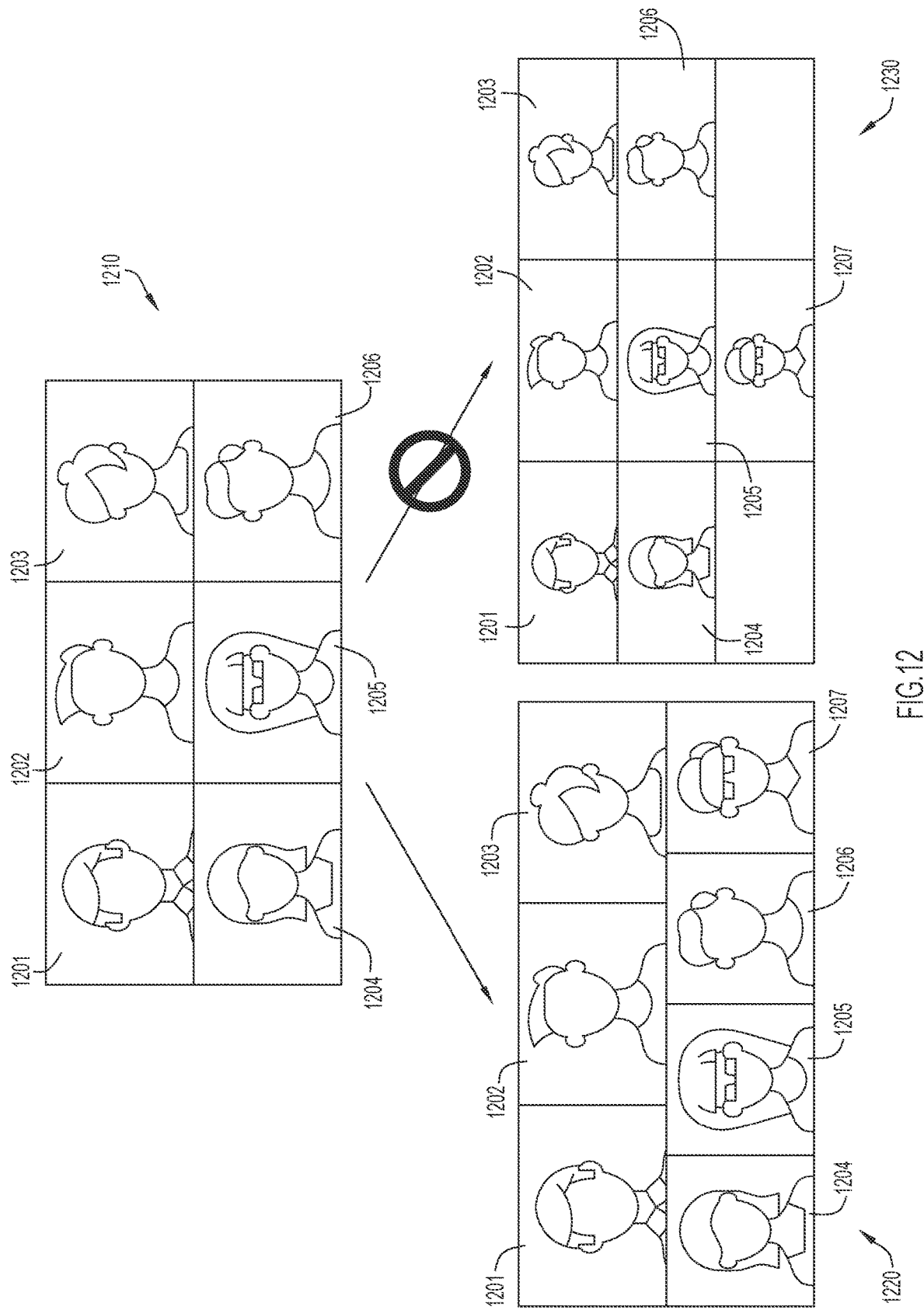
FIG. 12 illustrates maximizing screen space by cropping video streams, according to an example embodiment.

Reference is now made to FIG. 12. FIG. 12 illustrates an example in which increasing the amount of cropping on a set of video streams maximizes screen space while optimizing participant size. Display 1210 includes six video streams (i.e., video streams 1201, 1202, 1203, 1204, 1205, and 1206) on two rows. In this example, an additional video stream, video stream 1207 is added to the display. If the crops of video streams 1201-1206 are not changed, there is not room for video stream 1207 on either of the two rows of the display. As shown at 1230, if the crops are not altered, video stream 1207 is added to a third row, which results in the head size of the participants in the video streams decreasing and the amount of black space on the display increasing.

By increasing the crops of some video streams, however, video stream 1207 may be included on one of the two rows of the display. For example, as shown at 1220, video streams 1204, 1205, and 1206 have been cropped on the left and right sides to create space for video stream 1207. In this example, video stream 1207 has additionally been cropped on the right and left sides to fit on the second row. By increasing the crops, all seven video streams can fit on two rows, which optimizes the space on the display without decreasing the sizes of the participants in the video streams.

Figure 13:
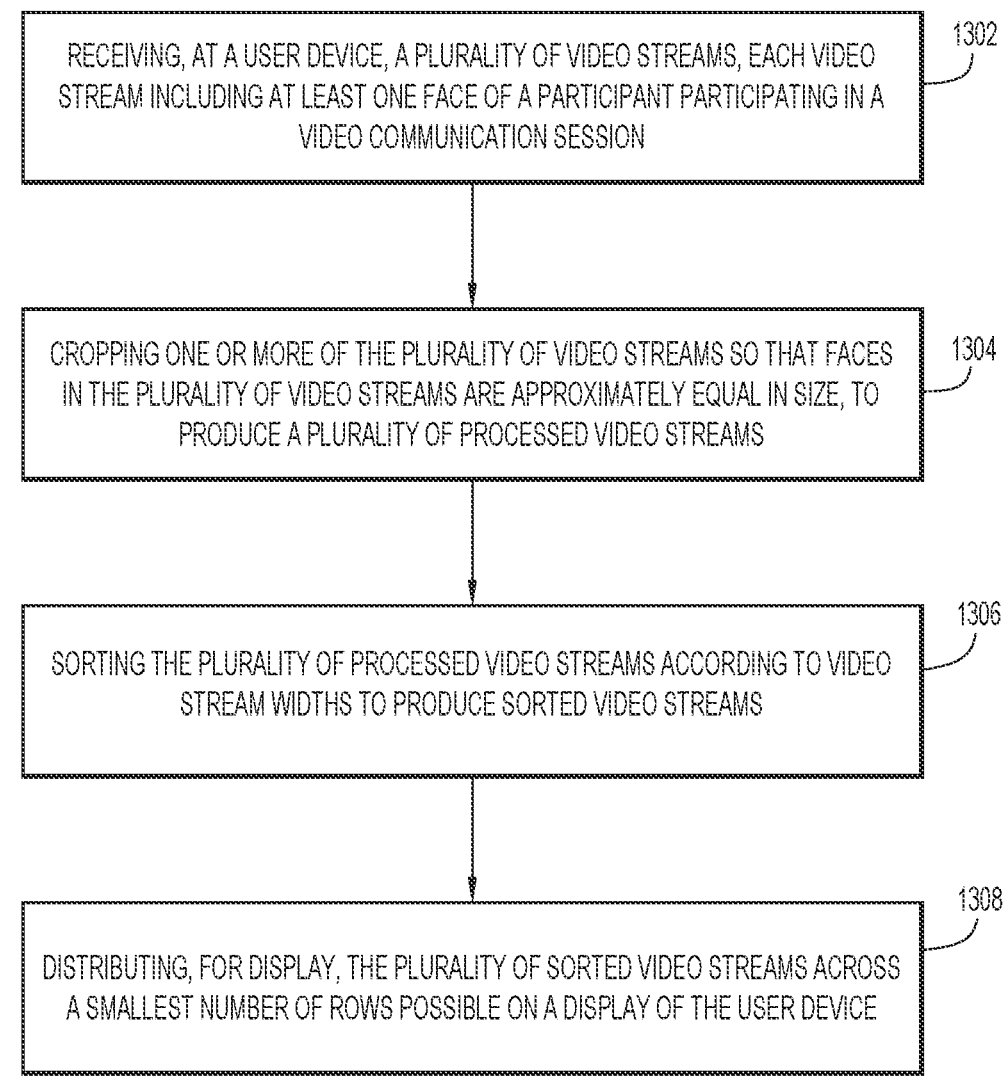
FIG. 13 is a flow diagram illustrating dynamic cropping of video streams during meetings, according to an example embodiment.

Reference is now made to FIG. 13. FIG. 13 is a flow diagram illustrating a method 1300 of dynamically adjusting cropping of video streams for display to maximize screen space, according to an embodiment. Method 1300 may be performed by one or more end devices 120-1 to 120-N in conjunction with meeting server(s) 110.

At 1302, a plurality of video streams are received at a user device. Each video stream includes at least one face of a participant participating in a video communication session. For example, an end device 120-1 to 120-N may receive video streams from other end devices 120-1 to 120-N for participating in an online meeting or video communication session.

At 1304, one or more of the plurality of video streams is cropped so that faces in the plurality of video streams are approximately equal in size, to produce a plurality of processed video streams. For example, an average face size of the faces in the plurality of video streams is calculated and the plurality of video streams are cropped so that the faces in the plurality of video streams are close to the same size, as described above with respect to FIG. 5.

At 1306, the plurality of processed video streams are sorted according to video stream widths to produce sorted video streams. For example, the video streams are sorted so the widest video streams (e.g., group video streams) are distributed first.

At 1308, the plurality of sorted video streams are distributed for display across a smallest number of rows possible on a display of the user device. In some embodiments, the cropping and/or aspect ratio of one or more of the sorted video streams may be changed so the video streams may be distributed across the smallest number of rows possible and/or to reduce or eliminate blank space on the display.

Figure 14:
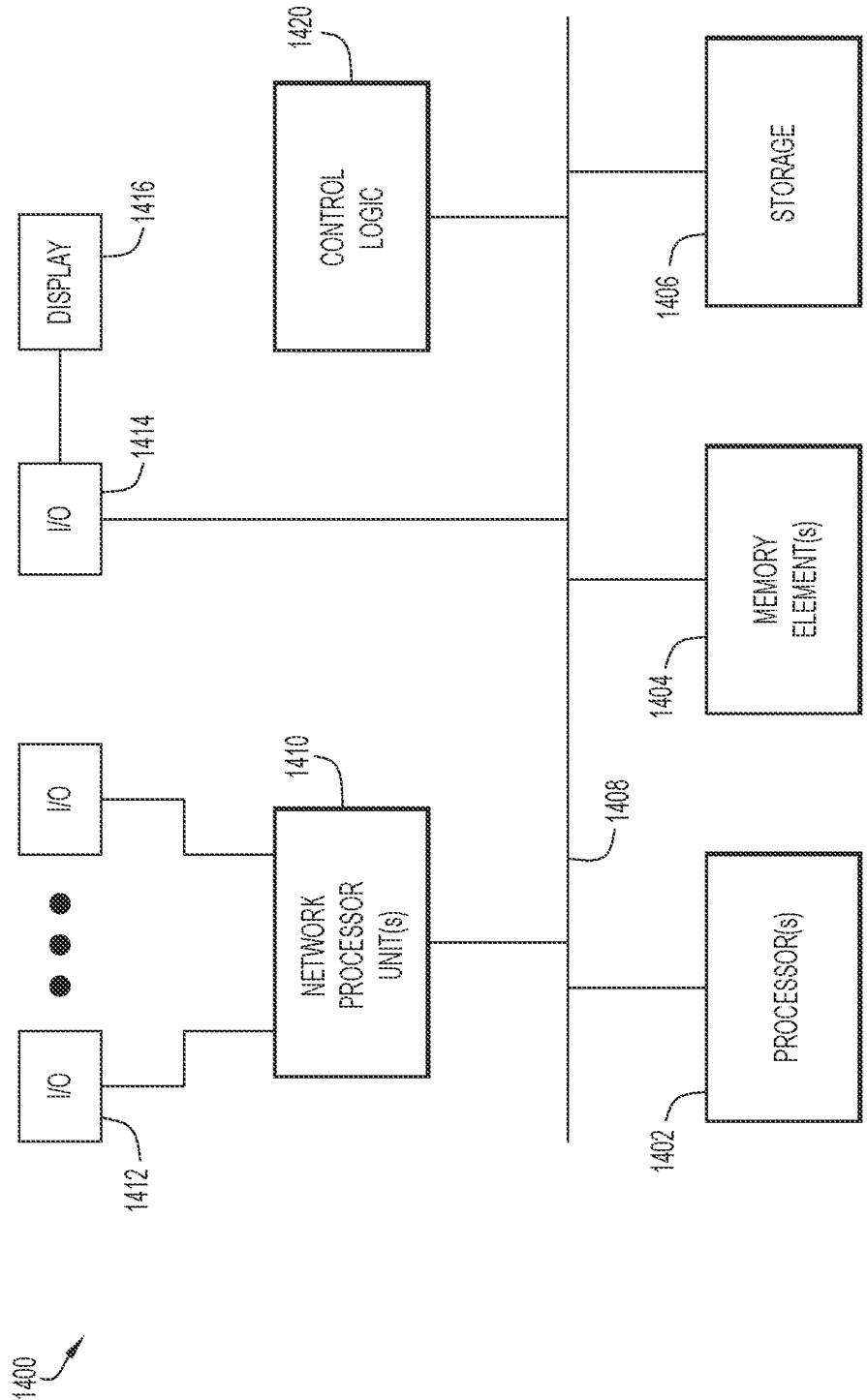
FIG. 14 is a block diagram of a device that may be configured to perform the techniques presented herein.

Reference is now made to FIG. 14. FIG. 14 is a block diagram of a computing device 1400 that may perform functions associated with operations discussed herein in connection with the techniques depicted in FIGS. 1-6, 7A, 7B, 8A, 8B, 9A, 9B, FIGS. 10A-10D, FIG. 11A, FIG. 11B, FIG. 12, and FIG. 13. In various embodiments, a computing device, such as computing device 1400 or any combination of computing devices 1400, may be configured to perform the functions of an end device or A meeting server in connection with the techniques of FIGS. 1-6, 7A, 7B, 8A, 8B, 9A, 9B, FIGS. 10A-10D, FIG. 11A, FIG. 11B, FIG. 12, and FIG. 13.

In at least one embodiment, the computing device 1400 may include one or more processor(s) 1402, one or more memory element(s) 1404, storage 1406, a bus 1408, one or more network processor unit(s) 1410 interconnected with one or more network input/output (I/O) interface(s) 1412, one or more I/O interface(s) 1414, and control logic 1420. In various embodiments, instructions associated with logic for computing device 1400 can overlap in any manner and are not limited to the specific allocation of instructions and/or operations described herein.

In at least one embodiment, processor(s) 1402 is/are at least one hardware processor configured to execute various tasks, operations and/or functions for computing device 1400 as described herein according to software and/or instructions configured for computing device 1400. Processor(s) 1402 (e.g., a hardware processor) can execute any type of instructions associated with data to achieve the operations detailed herein. In one example, processor(s) 1402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1404 and/or storage 1406 is/are configured to store data, information, software, and/or instructions associated with computing device 1400, and/or logic configured for memory element(s) 1404 and/or storage 1406. For example, any logic described herein (e.g., control logic 1420) can, in various embodiments, be stored for computing device 1400 using any combination of memory element(s) 1404 and/or storage 1406. Note that in some embodiments, storage 1406 can be consolidated with memory element(s) 1404 (or vice versa), or can overlap/exist in any other suitable manner.

In at least one embodiment, bus 1408 can be configured as an interface that enables one or more elements of computing device 1400 to communicate in order to exchange information and/or data. Bus 1408 can be implemented with any architecture designed for passing control, data and/or information between processors, memory elements/storage, peripheral devices, and/or any other hardware and/or software components that may be configured for computing device 1400. In at least one embodiment, bus 1408 may be implemented as a fast kernel-hosted interconnect, potentially using shared memory between processes (e.g., logic), which can enable efficient communication paths between the processes.

In various embodiments, network processor unit(s) 1410 may enable communication between computing device 1400 and other systems, entities, etc., via network I/O interface(s) 1412 (wired and/or wireless) to facilitate operations discussed for various embodiments described herein. In various embodiments, network processor unit(s) 1410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1400 and other systems, entities, etc. to facilitate operations for various embodiments described herein. In various embodiments, network I/O interface(s) 1412 can be configured as one or more Ethernet port(s), Fibre Channel ports, any other I/O port(s), and/or antenna(s)/antenna array(s) now known or hereafter developed. Thus, the network processor unit(s) 1410 and/or network I/O interface(s) 1412 may include suitable interfaces for receiving, transmitting, and/or otherwise communicating data and/or information in a network environment.

I/O interface(s) 1414 allow for input and output of data and/or information with other entities that may be connected to computing device 1400. For example, I/O interface(s) 1414 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like. In some embodiments, I/O interface(s) 1414 may provide a connection to a display 1416. Display 1416 may be a monitor, a touch screen display, or another type of display. In some embodiment, display 1416 may display video streams during an online meeting or communication session according to embodiments described herein.

In various embodiments, control logic 1420 can include instructions that, when executed, cause processor(s) 1402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1404 and/or storage 1406 can store data, software, code, instructions (e.g., processor instructions), logic, parameters, combinations thereof, and/or the like used for operations described herein. This includes memory element(s) 1404 and/or storage 1406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer implemented method is provided that comprises receiving, at a user device, a plurality of video streams, each video stream including at least one face of a participant participating in a video communication session; cropping one or more of the plurality of video streams so that faces in the plurality of video streams are approximately equal in size, to produce a plurality of processed video streams; sorting the plurality of processed video streams according to video stream widths to produce a plurality of sorted video streams; and distributing, for display, the plurality of sorted video streams across a smallest number of rows possible on a display of the user device.

In one example, the method further comprises adjusting cropping of the plurality of video streams to minimize unused pixels on the display of the user device, and distributing the plurality of video streams based on adjusting the cropping. In another example, the method further comprises determining sizes of faces in the plurality of video streams based on metadata associated with respective ones of the plurality of video streams. In another example, the method further comprises calculating a first average face size of all faces in the plurality of video streams. In another example, the method further comprises calculating a second average face size of faces in a particular video stream when the particular video stream includes multiple faces; and wherein cropping includes cropping the particular video stream when the second average face size is significantly smaller than the first average face size.

In another example, cropping further comprises cropping a top, bottom, left side, and right side of a particular video stream when the particular video stream includes a single face and a size of the single face is significantly smaller than the first average face size. In another example, cropping further comprises: cropping a right side and a left side of a particular video stream when the particular video stream includes a single face and a size of the single face is not significantly smaller than the first average face size. In another example, particular video streams that include multiple faces have been cropped by sender user devices to reduce empty areas around participants in the particular video streams.

In another form, an apparatus is provided comprising a memory; a network interface configured to enable network communication; and a processor, wherein the processor is configured to perform operations comprising: receiving a plurality of video streams, each video stream including at least one face of a participant participating in a video communication session; cropping one or more of the plurality of video streams so that faces in the plurality of video streams are approximately equal in size, to produce a plurality of processed video streams; sorting the plurality of processed video streams according to video stream widths to produce a plurality of sorted video streams; and distributing, for display, the plurality of sorted video streams across a smallest number of rows possible on a display of the apparatus.

In another form, one or more non-transitory computer readable storage media encoded with instructions are provided that, when executed by a processor of a user device, cause the processor to execute a method comprising: receiving a plurality of video streams, each video stream including at least one face of a participant participating in a video communication session; cropping one or more of the plurality of video streams so that faces in the plurality of video streams are approximately equal in size, to produce a plurality of processed video streams; sorting the plurality of processed video streams according to video stream widths to produce a plurality of sorted video streams; and distributing, for display, the plurality of sorted video streams across a smallest number of rows possible on a display of the user device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer implemented method comprising:
    receiving, at a user device, a plurality of video streams, each video stream being associated with a different endpoint device, and each video stream including at least one face of a participant participating in a video communication session;
    calculating an average face size of all faces in the plurality of video streams;
    identifying that one or more of the plurality of video streams includes a single face and a size of the single face is smaller than the average face size of all the faces in the plurality of video streams;
    cropping the one or more of the plurality of video streams so that faces in the plurality of video streams are approximately equal in size, to produce a plurality of processed video streams;
    identifying that a particular video stream of the plurality of video streams includes multiple faces in a single frame and an average face size of the multiple faces in the single frame is smaller than the average face size of all the faces in the plurality of video streams;
    determining whether cropping the particular video stream produces a processed particular video stream with an aspect ratio that is wider than an aspect ratio of the particular video stream;
    cropping around the multiple faces to produce the processed particular video stream based on determining that the aspect ratio of the processed particular video stream is wider than the aspect ratio of the particular video stream, wherein the processed particular video stream includes the multiple faces in the single frame;
    sorting the plurality of processed video streams and the processed particular video stream according to video stream widths to produce a plurality of sorted video streams; and
    distributing, for display, the plurality of sorted video streams across a number of rows on a display of the user device that minimizes unused space on the display.

2. The method of claim 1, further comprising:
    adjusting cropping of the plurality of sorted video streams to minimize unused pixels on the display of the user device, and
    distributing the plurality of sorted video streams based on adjusting the cropping.

3. The method of claim 1, further comprising determining sizes of faces in the plurality of video streams based on metadata associated with respective ones of the plurality of video streams.

4. The method of claim 1, wherein cropping the one or more of the plurality of video streams further comprises:
    cropping a top, bottom, left side, and right side of a particular video stream when the particular video stream includes a single face and a size of the single face is smaller than the average face size.

5. The method of claim 1, wherein cropping the one or more of the plurality of video streams further comprises:
    cropping a right side and a left side of a particular video stream when the particular video stream includes a single face and a size of the single face is not smaller than the average face size.

6. The method of claim 1, wherein the particular video stream has been cropped by a sender user device to reduce empty areas around participants in the particular video stream.

7. An apparatus comprising:
    a memory;
    a network interface configured to enable network communication; and
    a processor, wherein the processor is configured to perform operations comprising:
        receiving a plurality of video streams, each video stream being associated with a different endpoint device, and each video stream including at least one face of a participant participating in a video communication session;
        calculating an average face size of all faces in the plurality of video streams;

identifying that one or more of the plurality of video streams includes a single face and a size of the single face is smaller than the average face size of all the faces in the plurality of video streams;

cropping the one or more of the plurality of video streams so that faces in the plurality of video streams are approximately equal in size, to produce a plurality of processed video streams;

identifying that a particular video stream of the plurality of video streams includes multiple faces in a single frame and an average face size of the multiple faces in the single frame is smaller than the average face size of all the faces in the plurality of video streams;

determining whether cropping the particular video stream produces a processed particular video stream with an aspect ratio that is wider than an aspect ratio of the particular video stream;

cropping around the multiple faces to produce the processed particular video stream based on determining that the aspect ratio of the processed particular video stream is wider than the aspect ratio of the particular video stream, wherein the processed particular video stream includes the multiple faces in the single frame;

sorting the plurality of processed video streams and the processed particular video stream according to video stream widths to produce a plurality of sorted video streams; and distributing, for display, the plurality of sorted video streams across a number of rows on a display of the apparatus that minimizes unused space on the display.

8. The apparatus of claim 7, wherein the processor is further configured to perform operations comprising:
adjusting cropping of the plurality of sorted video streams to minimize unused pixels on the display of the apparatus, and
distributing the plurality of sorted video streams based on adjusting the cropping.

9. The apparatus of claim 7, wherein the processor is further configured to perform operations comprising:
determining sizes of faces in the plurality of video streams based on metadata associated with respective ones of the plurality of video streams.

10. The apparatus of claim 7, wherein the processor is configured to perform the operation of cropping the one or more of the plurality of video streams by:
cropping a top, bottom, left side, and right side of a particular video stream when the particular video stream includes a single face and a size of the single face is smaller than the average face size.

11. The apparatus of claim 7, wherein the processor is configured to perform the operation of cropping the one or more of the plurality of video streams by:
cropping a right side and a left side of a particular video stream when the particular video stream includes a single face and a size of the single face is not smaller than the average face size.

12. One or more non-transitory computer readable storage media encoded with instructions that, when executed by a processor of a user device, cause the processor to execute a method comprising:
receiving a plurality of video streams, each video stream being associated with a different endpoint device, and each video stream including at least one face of a participant participating in a video communication session;

calculating an average face size of all faces in the plurality of video streams;

identifying that one or more of the plurality of video streams includes a single face and a size of the single face is smaller than the average face size of all the faces in the plurality of video streams;

cropping the one or more of the plurality of video streams so that faces in the plurality of video streams are approximately equal in size, to produce a plurality of processed video streams;

identifying that a particular video stream of the plurality of video streams includes multiple faces in a single frame and an average face size of the multiple faces in the single frame is smaller than the average face size of all the faces in the plurality of video streams;

determining whether cropping the particular video stream produces a processed particular video stream with an aspect ratio that is wider than an aspect ratio of the particular video stream;

cropping around the multiple faces to produce the processed particular video stream based on determining that the aspect ratio of the processed particular video stream is wider than the aspect ratio of the particular video stream, wherein the processed particular video stream includes the multiple faces in the single frame;

sorting the plurality of processed video streams and the processed particular video stream according to video stream widths to produce a plurality of sorted video streams; and distributing, for display, the plurality of sorted video streams across a number of rows on a display of the user device that minimizes unused space on the display.

13. The one or more non-transitory computer readable storage media of claim 12, further comprising:
adjusting cropping of the plurality of sorted video streams to minimize unused pixels on the display of the user device, and
distributing the plurality of sorted video streams based on adjusting the cropping.

14. The one or more non-transitory computer readable storage media of claim 12, wherein cropping the one or more of the plurality of video streams further comprises:
cropping a top, bottom, left side, and right side of a particular video stream when the particular video stream includes a single face and a size of the single face is smaller than the average face size.

15. The one or more non-transitory computer readable storage media of claim 12, wherein cropping the one or more of the plurality of video streams further comprises:
cropping a right side and a left side of a particular video stream when the particular video stream includes a single face and a size of the single face is not smaller than the average face size.

16. The one or more non-transitory computer readable storage media of claim 12, further comprising:
determining sizes of faces in the plurality of video streams based on metadata associated with respective ones of the plurality of video streams.

17. The one or more non-transitory computer readable storage media of claim 12, wherein the particular video stream has been cropped by a sender user device to reduce empty areas around participants in the particular video stream.

18. The method of claim 1, wherein sorting the plurality of processed video streams and the processed particular video stream comprises sorting the plurality of processed video streams and the processed particular video stream to distribute widest processed video streams first.

19. The apparatus of claim 7, wherein, when sorting the plurality of processed video streams and the processed particular video stream the processor is further configured to perform operations comprising sorting the plurality of processed video streams and the processed particular video stream to distribute widest processed video streams first.

20. The one or more non-transitory computer readable storage media of claim 12, wherein sorting the plurality of processed video streams and the processed particular video stream comprises sorting the plurality of processed video streams and the processed particular video stream to distribute widest processed video streams first.

* * * * *